United States Patent [19]

Mitchell

[11] Patent Number: 4,506,690
[45] Date of Patent: Mar. 26, 1985

[54] PRESSURE REGULATOR SYSTEM

[75] Inventor: John D. Mitchell, Phoenix, Ariz.

[73] Assignee: The Garrett Corporation, Los Angeles, Calif.

[21] Appl. No.: 424,673

[22] Filed: Sep. 27, 1982

Related U.S. Application Data

[62] Division of Ser. No. 085,151, Oct. 15, 1979, Pat. No. 4,445,532.

[51] Int. Cl.³ ............................................. F16K 25/00
[52] U.S. Cl. ...................................... 137/1; 251/362; 251/363; 251/364
[58] Field of Search ........................ 137/315, 454.2, 1; 251/332, 362, 363, 364

[56] References Cited

U.S. PATENT DOCUMENTS

| | | | |
|---|---|---|---|
| 2,223,509 | 12/1940 | Brauer | 251/332 |
| 2,348,548 | 5/1944 | Koehler | 251/364 |
| 2,931,385 | 4/1960 | Carlisle et al. | 251/332 |
| 3,894,718 | 7/1975 | Koch et al. | 251/174 |

Primary Examiner—George L. Walton
Attorney, Agent, or Firm—J. Richard Konneker; Albert J. Miller

[57] ABSTRACT

A pressure regulator system for providing controlled reduction of fluid pressure from a relatively high pressure fluid source to a relatively low regulated fluid pressure output. The pressure regulator includes a pressure reduction regulator designed for stable flow under transonic conditions, and an improved solenoid valve assembly for switching the reduction regulator to an operational condition.

9 Claims, 6 Drawing Figures

PRESSURE REGULATOR SYSTEM

This is a division of application Ser. No. 085,151 filed Oct. 15, 1979, now U.S. Pat. No. 4,445,532.

BACKGROUND OF THE INVENTION

The subject matter of this application relates to the subject matter of concurrently filed application Ser. No. 085,151, filed Oct. 15, 1979, now U.S. Pat. No. 4,445,532 entitled "Solenoid Valve Assembly".

This invention relates to pressure regulator systems for providing a relatively low regulated fluid pressure output from a relatively high pressure fluid source. In one embodiment of the invention, the pressure regulator system is adapted for use as a pressure activated starting system for a gas turbine machine.

Gas turbine machines require for starting purposes a supply of pressurized fluid for initiating rotation of a turbo-compressor rotating group. Specifically, the rotating group must be accelerated to a minimum threshold speed for continued self-sustained operation of the gas turbine machine. In the prior art, one common source of pressurized starting fluid for gas turbine machines such as auxiliary power units for aircraft and the like comprises stored or bottled compressed air.

In some applications, a self-contained starting system is desirable wherein a relatively small and lightweight source of starting fluid is carried with the engine and is recharged by operation of the engine so as to allow the engine to be started whenever and wherever desired. See, for example, U.S. Pat. No. 4,068,468. In these self-contained systems, pressurized fluid is supplied from a reservoir tank through a pressure reduction regulator to the compressor of the turbo-compressor rotating group, or alternately, to a rotating starting motor. Once the gas turbine machine has reached self-sustaining operation, the reservoir is conveniently replenished with bleed air from the compressor so as to recharge the starting system for subsequent starting of the engine.

A major design difficulty in pneumatic self-contained starting systems arises in that substantial quantities of compressed fluid are required for starting the gas turbine machine. Accordingly, the reservoir is required to contain a substantial quantity of pressurized fluid for starting purposes. To reduce the size of the reservoir carried with the machine, the reservoir commonly contains this fluid at a relatively high pressure, say on the order of about 4,000 p.s.i. At these pressure levels, substantial pressure reduction through the pressure reduction regulator to say about 400 p.s.i. is necessary prior to supply of the fluid to the gas turbine machine for starting. This substantial pressure reduction results in transonic fluid flow through the pressure reduction regulator which correspondingly results in sonic shock waves and shock wave feedback whereby the regulator flow is highly irregular and unstable. It is therefore desirable to provide an improved pressure reduction regulator for use in applications such as self-contained pneumatic starting systems for providing substantial pressure reduction while at the same time assuring accurate and stable transonic flow therethrough.

A variety of other types of systems experience similar flow stability problems stemming from the reduction of a relatively high pressure fluid source to a relatively low regulated pressure fluid output. For example, pneumatic gun drives are known wherein it is necessary to reduce a high pressure fluid source of about 10,000–12,000 p.s.i. to a regulated pressure level of a few hundred p.s.i. In these other types of systems, similar fluid flow shock effects and the like are encountered resulting in a highly irregular and unstable fluid output pressure.

Another area of design difficulty in prior art pressure regulator systems comprises the operating characteristics of the control valve utilized to initiate supply of the high pressure fluid to the pressure reduction regulator. This valve typically comprises an electrically actuated solenoid valve including a valve member subjected to the relatively high pressure level of the pressurized fluid source. Accordingly, the solenoid valve must develop relatively high opening forces to overcome the pressure forces of the fluid source, and thereby initiate actuation of the system. However, it is well known that solenoid valves inherently develop increased force capacity throughout stroke of the associated valve member, whereas in this environment a maximum opening force is required in the initial stage of the valve member stroke. Therefore, in the prior art, a relatively expensive and oversized solenoid valve has been used so as to assure adequate opening forces upon initial stroke movement of the valve member. In the prior art some systems have attempted to overcome the solenoid size design problems by using a so-called impact solenoid valve wherein an armature is designed for limited lost motion movement prior to impacting a valve member. In this manner, the solenoid valve operates only through the latter, higher force portions of the stroke. See, for example, U.S. Pat. Nos. 2,612,188; 2,735,644; 3,043,336; 3,450,353; 3,473,380 and 3,974,998. However, these impact solenoid designs have not maximized the capacity of a relatively small and inexpensive solenoid valve to open a valve member to initiate actuation of the pressure regulator system.

The present invention overcomes the problems and disadvantages of the prior art by providing an improved pressure regulator system including a pressure reduction regulator for providing accurate flow and pressure under transonic flow conditions, and an improved solenoid valve assembly for maximizing the opening force capacity of a solenoid valve member.

SUMMARY OF THE INVENTION

In accordance with the invention, a pressure regulator system comprises a pressure reduction regulator coupled between a fluid supply reservoir containing a fluid pressurized to a relatively high pressure level, and a fluid-driven device such as a gas turbine machine starter requiring a motive fluid supply at a relatively low regulated pressure. The pressure reduction regulator includes a bulbular poppet valve adapted to seat upon a matingly configured multiple piece valve seat disposed between a high pressure inlet, and a low or regulated pressure outlet or exducer section. The poppet valve is positioned on the high pressure side of the valve seat, and has a generally conical cross section expanding in an upstream direction for self-centering and self-seating alignment upon the valve seat in response to pressure. Importantly, the poppet valve cross section has an included angle of on the order of about 40° extending from the high pressure side through the valve seat and partially into the exducer section to smoothly guide transonic high pressure flow through the valve seat. When closed, the poppet valve seats upon an annular ring formed from a plastic material or the like which wedges or bottoms against a rigid metal valve seat base.

The poppet valve is opened by introduction of the high pressure fluid into communication with one portion of a balancing system for balancing forces on opposite ends of the poppet valve. Moreover, a static pressure reference regulator couples a controlled and selectively reduced static pressure to another portion of the balancing system to create imbalanced forces to lift the poppet valve from the valve seat. When opened, the poppet valve modulates in response to the pressure of the high pressure fluid, and in response to the reference static pressure to provide a reduced regulated fluid pressure in the exducer section comprising a known function of the reference static pressure.

An improved solenoid valve assembly is provided for selectively coupling the high pressure fluid to the pressure reduction regulator when operation of the system is desired. This solenoid valve assembly includes an electrically controlled armature assembly for impacting a valve member to shift the valve member to an open position allowing high pressure flow through the pressure reduction regulator. More specifically, the armature assembly comprises an armature operably associated with a lost motion unit including a valve actuator and an energy storage spring. Movement of the armature through the initial stages of armature stroke moves the valve actuator to compress the spring for storing energy in the spring. Movement of the armature through latter stages of the stroke causes the valve actuator to impact the valve member, and this impact energy together with energy stored by the spring is sufficient to lift the valve member from its associated valve seat.

BRIEF DESCRIPTION OF THE DRAWINGS

The accompanying drawings illustrate the invention. In such drawings.

DETAILED DESCRIPTION OF THE PREFERRED EMBODIMENT

Figure 1:
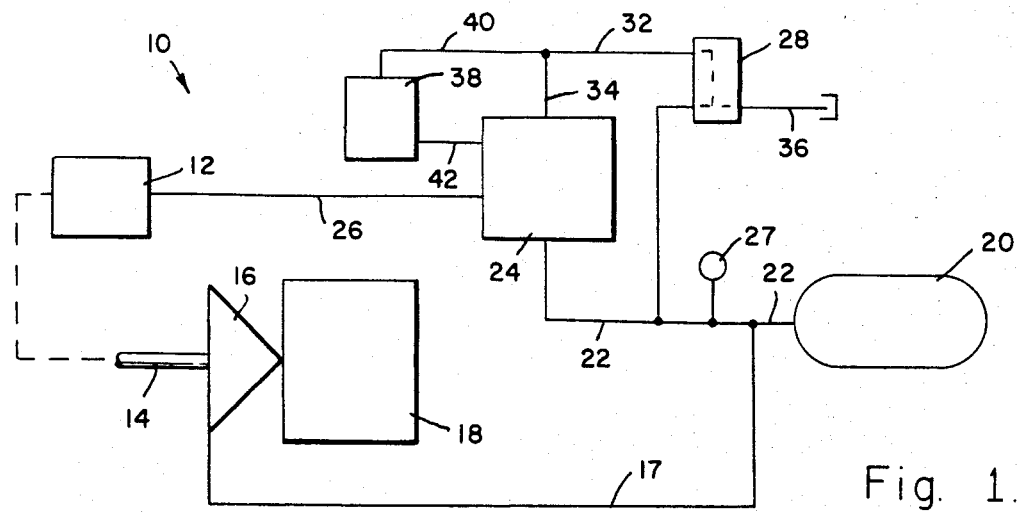
FIG. 1 is a schematic diagram illustrating a pneumatic starting system for a gas turbine machine, and including a pressure regulator system of this invention.

A pneumatic self-contained starting system 10 for a gas turbine engine is shown in FIG. 1, and generally comprises a rotatable starter motor 12 for rotatably driving a shaft 14 coupled to the compressor 16 of a gas turbine machine 18. Rotation of the compressor 16 develops compressed fluid discharged by the compressor which ultimately assists the gas turbine machine 18 in reaching continued self-sustained operation. Of course, when self-sustained operation is reached, the starter motor 12 may be suitably disconnected from the shaft 14 as by an overriding clutch (not shown) or the like for disconnecting the starting system 10 from the gas turbine machine 18.

The starter motor 12 is fluid-driven by a pressurized source of fluid provided from a portable supply tank or reservoir 20. The fluid in the supply reservoir 20 is typically at a relatively high pressure level, say on the order of about 4,000 p.s.i., and is initially supplied as by a conduit 22 to a pressure reduction regulator 24. The reduction regular 24 suitably reduces the pressure level of the fluid to a stable pressure on the order of about 400 p.s.i. for supply to the starter motor 12 as by a conduit 26. Conveniently, a meter 27 may be provided along the conduit 22 for monitoring the pressure level of fluid in the reservoir 20, and a return conduit 17 connects between the compressor 16 and the reservoir 20 to replenish the reservoir with bleed air after the machine 18 is started.

The pressure reduction regulator 24 is actuated for supply of fluid to the starter motor 12 as by a solenoid valve assembly 28. This valve assembly 28 is also coupled to the fluid supply reservoir 20 as by a high pressure conduit 30, and operates to control coupling of the high pressure fluid to an upper chamber (not shown in FIG. 1) of the pressure reduction regulator 24 as by conduits 32 and 33. More specifically, during operation of the starting system, the solenoid valve assembly 28 couples the high pressure supply fluid to the upper chamber, and when the starting system is disabled the solenoid valve assembly couples this upper chamber to atmosphere via a vent 36. Moreover, during operation of the system, the solenoid valve assembly 28 couples high pressure fluid to a static reference pressure regulator 38 as by a conduit 40, and this device serves to provide a static regulated reference pressure to the pressure reduction regulator 24 by a conduit 42 for closely controlling operation of the reduction regulator 24. Importantly, this reference pressure regulator 38 typically comprises a relatively conventional spring-diaphragm system, and thereby is not shown or described in detail herein.

While the components of the pressure regulator system of this invention, including the pressure reduction regulator 24, solenoid valve assembly 28, and static reference pressure regulator 38, are illustrated herein in conjunction with a pressure activated starting system for a gas turbine machine, it should be understood that the pressure regulator system is applicable to a variety of pressure systems. That is, the pressure regulator system of this invention is readily adapted for use whenever a relatively low regulated fluid pressure is required from a relatively high pressure fluid source. Exemplary systems wherein the pressure regulator system of this invention is applicable include pneumatic gun drives, and the like.

The pressure reduction regulator 24 is shown in more detail in FIGS. 2-5. As shown, the reduction regulator 24 comprises a multi-section valve body 44 which is suitably coupled together as by a series of bolts 46. This valve body 44 includes an inlet end 47 for coupling to the high pressure fluid supply conduit 22, and an outlet or exducer section 48 communicating with the low pressure outlet conduit 26 connected to the starter motor 12. Between the inlet end 47 and the exducer section 48, a multiple piece valve seat 50 is arranged for seating a bulbular or generally tulip-shaped poppet valve head 52. More specifically, an annular ring 54 formed from a suitable deformable plastic material having high quality resilient memory, such as a polyimide, comprises a primary valve seat having a generally wedge-shaped seat face 56. This primary seat ring 54 is wedged as will be described in more detail upon a valve seat base 58 formed from a suitable metal such as stainless steel or the like. Importantly, the valve seat base 58 includes an annular exducer shroud 60 which extends into and radially expands slightly into an exducer collection chamber 163 downstream of the valve seat base 58. With this configuration, the bulbular valve head 52 combines with the multiple piece valve seat 50 to define a converging-diverging nozzle flow path past the valve seat 50 when the valve head 52 is in an open position.

The poppet valve head 52 has a cross section which extends and expands from a valve stem 62 within the exducer section 48 through the valve seat 50 into the high pressure region within the inlet end 47. Accordingly, the poppet valve head 52 is arranged for seating upon the valve seat face 56 of the plastic ring 54 in a self-aligning and self-centering manner. Moreover, the high pressure fluid within the inlet end 47 of the reduction regulator 24 urges the valve head 52 toward a normal position seated upon the valve seat 50 to close the reduction regulator 24 to fluid flow.

Figure 3:
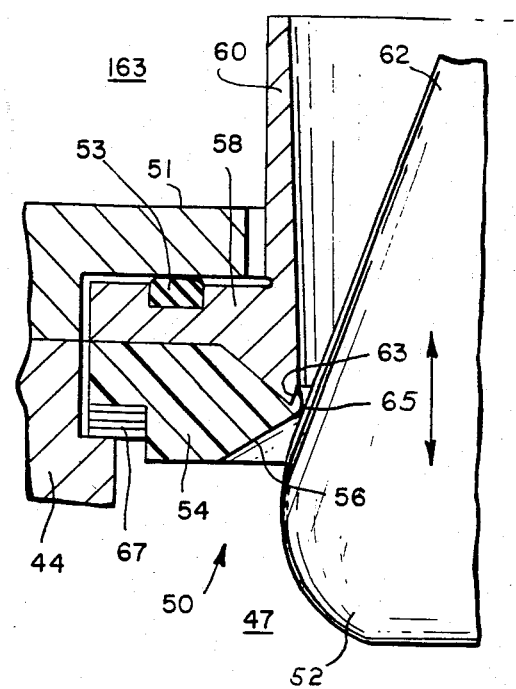
FIG. 3 is an enlarged fragmented view of the reduction regulator of FIG. 2, showing the regulator in a position closed to fluid flow.
Figure 4:
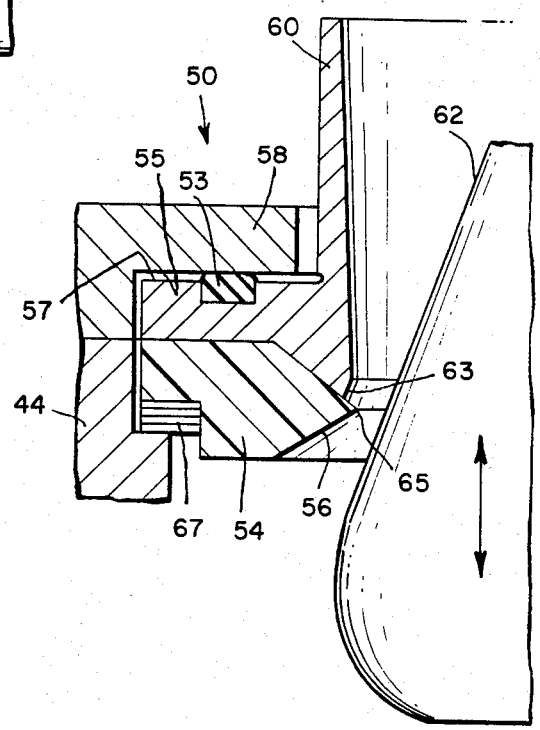
FIG. 4 is an enlarged fragmented view similar to FIG. 3, showing the reduction regulator in a position open to fluid flow.
Figure 5:
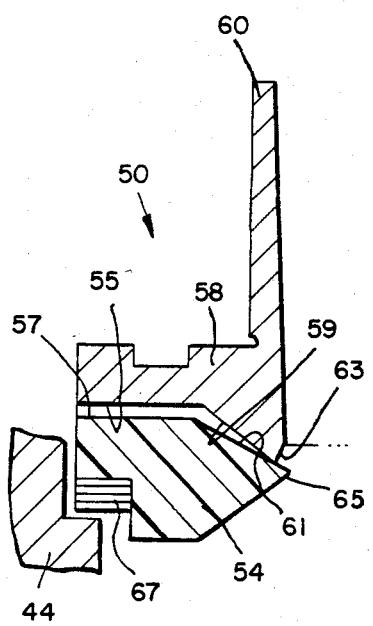
FIG. 5 is an enlarged fragmented view similar to FIGS. 3 and 4, partially exploded, illustrating the interfitting components of the reduction regulator valve seat.

The configuration of the multiple piece valve seat 50 is shown in detail in FIGS. 3-5. As shown, one section of the valve body 44 includes an inwardly radiating flange 51 forming a support surface for the valve seat base 58. If desired, a seal ring 53 is interposed between the flange 51 and the seat base 58 to prevent fluid leakage therebetween. The valve seat base 58 is configured to have a horizontal bearing surface 55 formed in parallel with a mating surface 57 on the plastic ring 54, and a tapered conical face 59 which is slightly out of angular alignment with a corresponding tapered conical face 61 on the plastic ring 54 (FIG. 5). For example, the conical face 59 on the seat base 58 is formed at an angle of about 31° from the horizontal, whereas the conical face 61 on the plastic ring 54 is formed at an angle of about 29° from the horizontal. Moreover, the conical face 59 of the seat base 58 terminates in an angular bearing surface 63 for matingly engaging the conical cross section of the valve head 52, whereas the conical face 61 of the plastic ring 54 cooperates with the wedge-shaped valve seat face 56 to form a point 65. This point 65 slightly overlies the seat base bearing surface 63 so that the valve head 52 contacts first the point 65 of the plastic ring 54 upon movement to a closed position.

The seat base 58 and the plastic ring 54 of the valve seat 50 are wedged into position as illustrated in FIG. 5 by means of shims 67 to bring their respective horizontal bearing surfaces 55 and 57 into bearing engagement. The shims 67 also force the plastic ring 54 to deform slightly to bring the conical faces 59 and 61 into bearing engagement. This slight deformation places the plastic ring 54 under pressure so that the valve head 52, when moved to the closed position as shown in FIG. 3, engages the point 65 of the plastic ring 54 to force the point 65 into a bottomed-out position overlying the angular bearing surface 63 of the seat base 58. When the valve head 52 returns to an open position, the point 65 returns to its original position, as illustrated in FIG. 4. With this arrangement, the multiple piece valve seat 50 cooperates with the valve head 52 to provide a high quality, leak-free seal when the valve head is in the closed position. Conveniently, the plastic ring 54 and the seat base 58 are formed with radial clearance with respect to the valve body 44, as indicated by arrow 69, so as to allow a slight radial floating for self-centering with the valve head 52.

Figure 2:
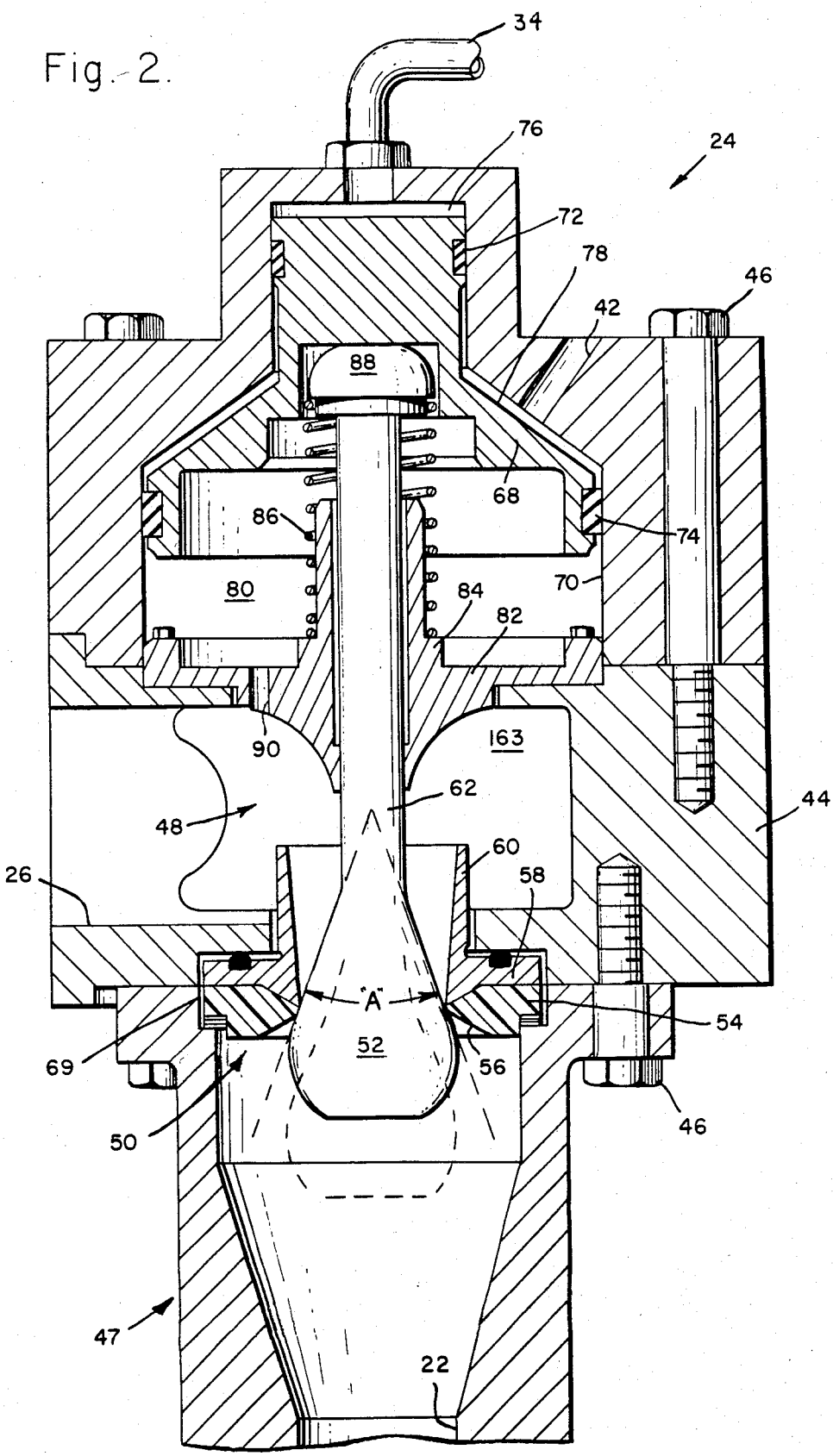
FIG. 2 is a vertical section of a pressure reduction regulator for use in the regulator system.

The cross sectional profile of the poppet valve head 52 is carefully tailored to provide smooth transonic fluid flow from the high pressure inlet end 47 of the regulator 24 to the exducer section 48. That is, as shown in FIG. 2, the expanding cross section of the bulbular-shaped valve head 52 is formed generally to have an included angle "A" on the order of about 40°. This included angle "A" configuration extends through the valve seat 50 to define the digerging portion of the nozzle path having a flow angle between the valve head 52 and the shroud 60 of about 35O. This configuration has been found to provide smooth transonic fluid flow through the valve seat 50 by removing transversely acting sonic shock waves and feedback effects from the vicinity of the valve seat 50 whenever the valve head 52 is moved to the open, dotted line position illustrated in FIG. 2. This provision of smooth, transonic fluid flow results in a stable and controlled pressure output supplied to the starter motor 12 via the conduit 26. Of course, the specific included angle is tailored to match the particular pressure differential encountered across the valve seat 50 for a given application of the reduction regulator, and may vary considerably from 40°. However, in many typical systems encountering an approximate 10:1 pressure reduction ratio and a pressure differential of say about 3,000-10,000 p.s.i., and a mass flow rate of about 100 pounds per minute, an included angle of about 40° has been found to produce the desired smooth, stable transonic flow. Moreover, it has been found that the optimum included angle generally decreases with increases in transonic mass flow.

The valve head 52 is moved to the open, dotted line position of FIG. 2 by means of a balancing system including a balancing piston 68 received within a cylinder 70 in the upper end of the valve body 44. As shown, the balancing piston 68 is elongated within the cylinder 70, and includes an upper seal ring 72 and a lower seal ring 74. The central portion of the balancing piston 68 expands radially and downwardly in conformance with the contour of the cylinder 70 so as to define an upper pressure chamber 76, an intermediate pressure chamber 78, and a lower pressure chamber 80. Controlled pressures, as will be hereafter described, are applied to these pressure chambers 76, 78, and 80 to move the balancing piston 68 downwardly into bearing engagement with the upper end of the valve stem 62, and thereby control the position of the valve head 52 with respect to the valve seat 50. Conveniently, the lower pressure chamber 80 is partially closed at its lower end by a plate 82 including a central boss 84 comprising a valve guide for the valve stem 62. A compression spring 86 reacts between the plate 82 and an enlargement 88 at the upper end of the valve stem 62 to bias the entire assembly to a position closing or seating the valve head 52 on the valve seat 50 to block fluid flow through the reduction regulator 24.

As illustrated in FIGS. 1 and 2, the solenoid valve assembly 28 operates to couple high pressure supply fluid from the fluid reservoir 20 to the pressure reduction regulator 24 via the conduits 32 and 34. The conduit 34, when supplied with high pressure fluid, couples the high pressure fluid to the upper pressure chamber 76 in communication with the balancing piston 68. Importantly, the surface area of the balancing piston 68 exposed to this upper chamber 76 generally corresponds with the surface area of the poppet valve head 52 exposed to high pressure fluid within the inlet end 47, whereby the opposite ends of the poppet valve head 52 within the reduction regulator 24 are substantially pressure-balanced. However, the solenoid valve assembly 28 also functions to supply the high pressure fluid to the static reference pressure regulator 38 which in turn supplies the static reference pressure to the reduction regulator 24 via the conduit 42. This conduit communicates the reference pressure to the intermediate pressure chamber 78 so as to create a force imbalance upon the balancing piston 68. This force imbalance urges the balancing piston 68 to move downwardly within the cylinder 70 and thereby also to urge the poppet valve 52 to move off the valve seat 50. Opening of the valve head 52 allows the pressure level in the collection chamber 163 of the exducer section 48 to increase. The increasing pressure level in this collection chamber 163 is communicated with the lower pressure chamber 80 of the cylinder 70 via a port 90 formed in the plate 82 so as to allow the pressure level in the lower pressure chamber 80 also to increase. Importantly, the combined effect of the increasing pressure in the lower pressure chamber 80 together with spring forces applied by the spring 86 urges the balancing piston 68 back toward the upper full line position shown in FIG. 2 to attempt to close the poppet valve head 52. In this manner, the position of the poppet valve head 52 is modulated with respect to the valve seat 50 to balance the total forces upon the balancing piston 68 and thereby provide a predetermined and stable output pressure to the starter motor 12. In practice, the level of this output pressure generally corresponds in magnitude to the pressure level of the static reference pressure applied to the balancing piston 68 less spring forces applied to the piston 68.

Figure 6:
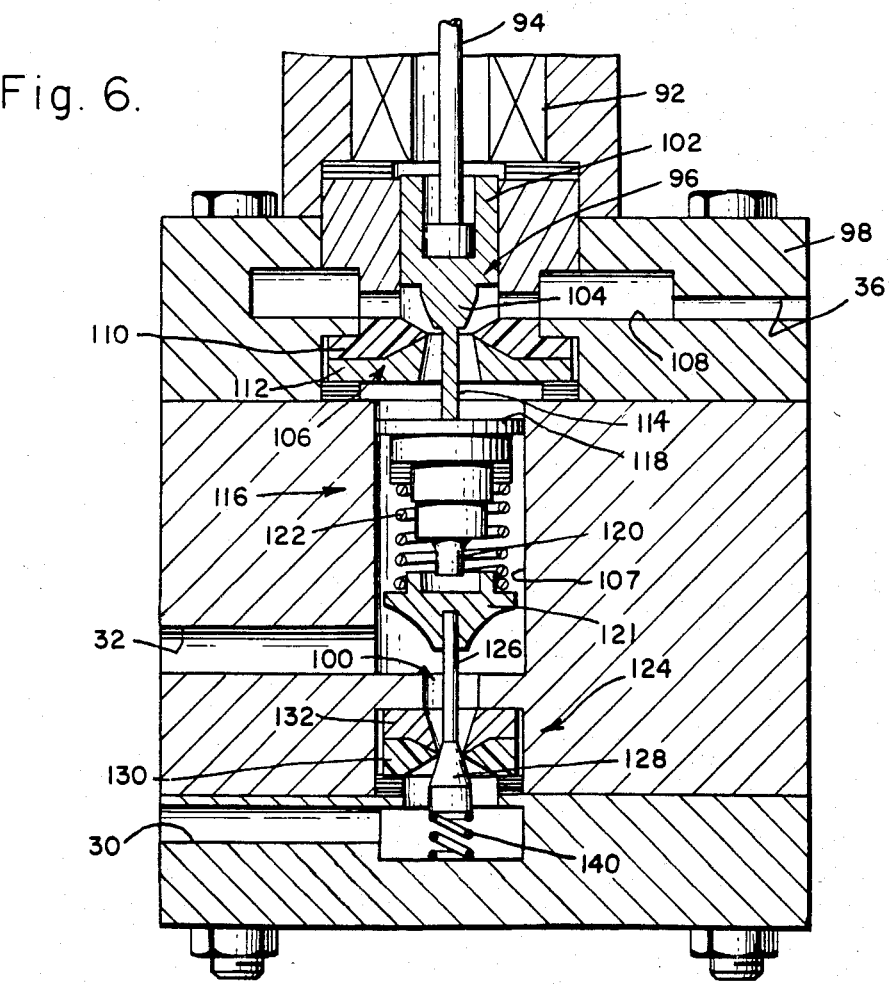
FIG. 6 is a vertical section, partially fragmented, of an improved solenoid valve assembly for use in the system.

The solenoid valve assembly 28 of this invention is shown in more detail in FIG. 6. As shown, the valve assembly 28 includes a solenoid winding 92 and a movable armature 94 which is magnetically shifted by means of control of electrical current in the winding 92, in a well known manner. The armature 94 operates a vent valve 96 carried in an upper portion of a valve body 98 for closing the vent conduit 36, and at the same time operates a high pressure valve 100 for opening communication between the high pressure inlet conduit 30 and the outlet conduit 32.

More specifically, the vent valve 96 includes a hollow base 102 into which the armature 94 is received in bearing engagement with the valve 96. When the armature is shifted downwardly as viewed in FIG. 6, a valve member 104 of generally conical cross section formed integrally with the hollow base 102 is moved into sealing engagement with an associated valve seat 106. Contact with the valve seat 106 closes off communication between a central cavity 107 in the valve body 98 and a collection chamber 108 communicating with the vent conduit 36. Since the central cavity 107 communicates with the outlet conduit 36, closure of the vent valve member 104 removes a vent connection venting the upper chamber 76 of the reduction regulator 24 (see FIG. 2). Conveniently, as shown in FIG. 6, the vent valve seat 106 comprises a multiple piece valve seat including a resilient plastic ring 110 based upon a metal seat base 112, similar to the valve seat 50 of FIG. 2.

The vent valve 96 also includes a push rod 114 which extends downwardly into the central cavity 107 to bearingly engage a lost motion unit 116. That is, the push rod 114 engages a plate 118 from which a valve actuator 120 depends downwardly. The valve actuator 120 comprises a push rod type member which is maintained in vertically spaced relation above an impact plate 121 by a compression spring 122. Importantly, the spacing between the valve actuator 120 and the impact plate 121 is carefully chosen to be slightly less than the stroke length of the solenoid armature 94. That is, in a preferred embodiment by way of example, the spacing between the valve actuator 120 and the impact plate 121 is chosen to be about 0.040 inch with a solenoid armature stroke travel of about 0.045 inch. With this arrangement, during the initial and major portion of the solenoid armature stroke, lost motion occurs between the valve actuator 120 and the impact plate 121 resulting in compression of the spring 122 to store kinetic and potential energy in the spring.

When the valve actuator 120 strikes the impact plate 121, the high pressure valve 100 is moved off its associated valve seat 124 to open high pressure fluid flow to the outlet conduit 32. That is, the high pressure valve 100 includes a valve stem 126 secured to the impact plate 121 and formed integrally with a high pressure valve head 128 of generally conical cross section. Impact of the valve actuator 120 with the impact plate 121 thus shifts the valve head 128 off its seat 124 to open the valve 100 to fluid flow. Conveniently, this valve seat 124 also comprises a multiple piece valve seat having a deformable plastic ring 130 supported upon a rigid metal seat base 132, in the same manner as the valve seat 50 of FIG. 2.

The solenoid valve assembly 28 of this invention maximizes the capacity of the solenoid core 92 and armature 94 to open the high pressure valve 100. That is, during the initial, relatively low-force portion of the initial armature travel, kinetic and potential energy is stored in the spring 122 of the lost motion unit 116. During the latter, maximum power portion of the armature travel, the valve actuator 120 impacts the impact plate 121 to directly shift the high pressure valve head 128 from its seat 124. Importantly, the impact forces comprise a summation of direct solenoid energy together with energy stored by the spring 122. Once the valve head 128 initially lifts from its seat 124, the high pressure differential across the seat is removed and further opening movement is readily accomplished by means of remaining stored energy in the spring 122. Thus, in operation, downward movement of the armature 94 substantially simultaneously closes the vent valve 96 and begins movement of the high pressure valve 100. The armature 94 moves the vent valve 96 to close off the vent connection to the outlet conduit 32, and at the same time opens the high pressure valve 100 to couple high pressure fluid to the outlet conduit 32. In this manner, high pessure fluid is supplied to the pressure reduction regulator 24 (FIG. 1) and to the static reference pressure regulator 38 to initiate operation of the pressure regulator system 10. Of course, when the solenoid valve assembly is de-energized, the armature 94 retracts to allow high pressure in the conduit 30 to close the high pressure valve 100 and open the vent valve 96. If desired, a compression spring 140 may be provided in engagement with the high pressure valve head 128 to assist return thereof to a closed position.

A wide variety of modifications and improvements of the pressure regulator system of this invention are believed to be possible within the scope of the art. For example, if necessary, the static reference pressure regulator 38 may be designed to include a valve poppet and multiple piece valve seat construction generally consistent with that of the pressure reduction regulator 24 described in detail herein. Accordingly, no limitation of the invention is intended by way of the description herein except as set forth in the appended claims.

What is claimed is:

1. A valve for controlling fluid flow between a fluid inlet and a fluid outlet, comprising a valve seat including a rigid valve seat base and a resilient elastomeric ring overlying said base, said base and ring each being formed to have annular mutually parallel bearing surfaces and to have annular tapered conical faces extending radially inwardly from said parallel bearing surfaces slightly out of angular alignment with each other, said tapered conical face of said seat terminating in an angularly oriented bearing surface, and said tapered conical face of said ring terminating in a radially inwardly projecting point overlying said angularly oriented bearing surface; means for deforming said ring to bring said parallel bearing surfaces and the conical face of said base and ring into bearing engagement with each other; and a valve head having a generally conical cross section generally corresponding with said angularly oriented bearing surface, and arranged for seating upon said point of said ring whereby said point is folded over onto said angularly oriented bearing surface, between said valve head and said angularly oriented surface when said valve head is seated.

2. The invention as set forth in claim 1 wherein said ring is disposed on the side of said base adjacent the fluid inlet.

3. The invention as set forth in claim 2 wherein the conical cross section of said valve head expands from the fluid outlet through the valve seat into the fluid inlet.

4. The invention as set forth in claim 1 wherein said valve seat and valve head self-align with each other.

5. The invention as set forth in claim 1 wherein said ring is formed from a polyimide.

6. The invention as set forth in claim 1 wherein said valve head is formed to have a cross sectional included angle of on the order of about 40°.

7. A method of controlling fluid flow between a fluid inlet and a fluid outlet, comprising the steps of positioning along a fluid path a valve seat including a rigid valve seat base and a resilient elastomeric ring overlying the base; providing the base and ring with annular mutually parallel bearing surfaces and with tapered conical faces extending from the bearing surfaces radially inwardly and slightly out of angular alignment with each other; providing the termination of the tapered conical face of the seat with an angularly oriented bearing surface, and providing the termination of the tapered conical face of the ring with a radially inwardly projecting point overlying the angularly oriented bearing surface; deforming the ring to bring the parallel bearing surfaces and the tapered conical faces to the ring and base into mating engagement; providing a valve head having a conical cross section generally corresponding with the configuration of the angularly oriented bearing surface on the base; and arranging the valve head for seating upon the point of the ring whereby the ring is folded over onto the angularly oriented bearing surface, between said valve head and said angularly oriented surface, when the valve head is seated.

8. The method of claim 7 including arranging the valve head for seating upon the ring at the side of the base adjacent the fluid inlet.

9. The method of claim 7 including mounting the valve seat with limited radial freedom of movement for self-alignment with the valve head.

* * * * *